United States Patent Office 2,726,207
Patented Dec. 6, 1955

2,726,207

DRILLING FLUID CONTAINING WATER-SOLUBLE SILICONES

Norman Healey, Maracaibo, Venezuela, assignor to Shell Development Company, Emeryville, Calif., a corporation of Delaware No Drawing. Application April 13, 1954,
Serial No. 422,979

Claims priority, application Austria July 31, 1953

11 Claims. (Cl. 252—8.5)

This invention relates to the drilling of oil and gas wells and pertains more particularly to an aqueous drilling fluid composition containing an alkali or alkaline earth metal hydrocarbon siliconate and to a method of reducing or maintaining the low viscosity of drilling fluids of the type used in the rotary method of drilling wells by adding thereto one of said siliconates.

In normal well drilling operations, wherein a well is drilled by the rotary method, the well borehole is generally filled by a drilling fluid or mud which is circulated therein. Drilling muds are usually pumped down through the drill stem of the rotary rig and around the drill bit, returning to the surface through the annular passage between the drill stem and the well casing. These drilling muds perform a number of functions, including forming a substantially impermeable filter cake on the walls of the borehole to prevent the loss of fluid into the formation penetrated, lubricating the drill stem and bit, carrying the cuttings from the bit up the borehole to the surface, and providing a hydrostatic head against the walls of the well to prevent the uncontrolled escape of gases or liquids from the formations traversed by the borehole.

Prime requisites of a satisfactory drilling fluid are good flow properties and good plastering or sheath forming characteristics. A good drilling fluid must form on the walls of the borehole a mud sheath for effectively preventing any appreciable fluid loss to the formation. A loss of fluid to the formation is undesirable at any time during drilling, being especially objectionable when drilling into the producing zone, which may be contaminated and plugged by said fluid.

In order to perform the desired functions, a drilling fluid must have a sufficiently high gel strength to avoid the settling of weighting agents which are added to increase the density of the mud. At the same time, it is desirable that the viscosity of the mud be low enough to secure high rates of circulation so that the bit cuttings may be carried to the surface by the stream of drilling fluid. A substantial increase in the viscosity and/or gel strength of a drilling fluid is undesirable as it tends to overload the mud pumps that circulate the drilling fluid within the well, so that a proper circulation rate cannot be maintained.

The properties of a drilling fluid undergo changes during drilling due to the fact that the borehole traverses various strata, such as shales, clays, etc., cuttings from which become dispersed in the fluid. It is known that, when an aqueous liquid, for example, a clay-water suspension, is used as a drilling fluid, a number of undesired phenomena may occur especially when drilling through layers of unstable clay, such as, for example, heaving shales. In drilling through such clay formations with an aqueous drilling fluid, the wall of the borehole is attacked by the fluid, which causes swelling of the clay and serious caving and irregular widening of the borehole, whereby the drilling tools may become stuck in the borehole and eventally bring about a total loss of the hole.

An aqueous drilling mud also assimilates clay from the formation drilled, often causing the viscosity of the drilling fluid to increase to an undesirably high value so that the mud cannot be readily pumped. On observing any substantial change in the viscosity of the fluid, the drilling fluid is normally treated with chemicals so as to counteract the effect of the clay or other contaminants. Alternatively, the drilling mud often has to be diluted with water, while weighting materials, such as barytes, are simultaneously added in order to maintain the weight of the drilling mud at a substantially constant value. Additionally, a suspending agent, for example, a colloidal material such as bentonite, may be added to the drilling mud in order to keep the additional weighting material in suspension in the diluted mud and to prevent said weighting material from settling out.

Furthermore, in drilling through certain clays while using a water-base drilling mud, difficulties frequently arise due to the fact that clay clings to the drill pipe, drill collars and drill bit (producing what is known as the "balling-up" effect). This condition may likewise cause the drilling tools to stick.

In order to eliminate many of the troubles described above, varying quantities of oil may be added to the drilling mud. The quantity of oil added to the mud must be emulsified in the clay-water mud, generally while an emulsifier is being added. The conversion of a water-base mud to an oil-in-water drilling emulsion is not always easy to carry out, and additional difficulties are often encountered with regard to stabilizing such an emulsion, especially in the case of high-temperature wells. Furthermore, any attempt to prove the presence of oil in the formation being drilled through by an examination of the rock cuttings coming to the surface is rendered exceedingly difficult due to the contamination of the drill cuttings with oil from the drilling emulsion.

It is, therefore, an object of the present invention to provide a method for reducing excessive viscosity of an aqueous drilling fluid which does not rely on the mere dilution of the drilling fluid with additional amounts of water, and which does not necessitate the conversion of the drilling fluid to an oil-in-water drilling emulsion by the addition of oil thereto.

Another object of this invention is to provide for reducing the viscosity of a drilling fluid without altering the weight of said drilling fluid, and without adversely affecting the stability or plastering properties of the drilling fluid.

It is also an object of the present invention to provide an aqueous drilling fluid which may be employed in drilling through heaving shale formations to eliminate or greatly minimize the caving of the shale which normally occurs with ordinary water-base drilling muds.

A further object of this invention is to provide an aqueous drilling mud composition which exhibits many of the desirable characteristics of an oil-base mud or emulsion without having the undesirable ones.

Another object of this invention is to provide an aqueous drilling mud composition which is not adversely affected by high-well temperatures or contaminating materials picked up during drilling operations.

These and other objects may be readily achieved according to this invention by adding to a drilling fluid a suitable amount of a water-soluble organic silicon compound containing oxygen, as will be understood from the following description of the invention.

The terms water-base drilling fluid, acqueous-base drilling fluid or water-containing drilling fluid employed herein and in the appended claims, generally include water-base drilling fluids having a liquid base substantially comprising only water or salt water. However, at times, certain small amounts of oil may become emulsified or admixed with the water-base mud, the oil coming either from an oil formation drilled into, or said oil being purposely added to said water-base drilling mud to change or alter its characteristics, as necessitated by changing drilling conditions. Drilling fluids of the present invention have had as much as 20% of oil emulsified therewith without having the oil cause any deleterious effects on the behavior of the drilling mud. However, since the treatment of a normal water-base mud, according to the present invention, converts said mud into a fluid with many of the advantages of an oil-base mud, the use of emulsified oil along with the present treatment of a water-base mud is generally not necessary.

It has now been found that most of the above-described undesirable occurrences can be prevented by adding to a water-base drilling fluid a minor amount of one or more organic silicon compounds containing oxygen, which are soluble in water, such as water-soluble siliconates. The present invention, therefore, is predicated upon the discovery that the viscosity of aqueous-base drilling fluids may be reduced by the addition thereto, or the inclusion therein, of small quantities of one or more water-soluble hydrocarbon siliconates, which term includes alkyl, cycloalkyl and aryl siliconates. The term alkaline metal hydrocarbon siliconate is employed herein and in the appended claims, to include both the alkali metal and the alkaline earth metal form of the siliconate. The alkyl radical may have a carbon length of preferably not more than 6 carbon atoms and be in any form as long as the resultant alkaline metal alkyl siliconate is water-soluble.

The present invention can be practiced by adding a small quantity (0.1 to 5.0% by weight) of an alkaline metal hydrocarbon siliconate to drilling fluids of the water-base type. The addition of one or more of the above-described water-soluble silicon compounds to a water-base drilling fluid has been found to be a much more simple process than the conversion of an aqueous drilling fluid into a drilling emulsion by the addition of oil thereto. In addition, the above-described silicon compounds may also be added in small quantities to an already existing oil-in-water drilling emulsion.

Drilling fluids may comprise several components which commonly include a suspending component or medium, a suspended component and/or plastering agent, and oftentimes an emulsifying or stabilizing agent, if the fluid is in the form of an emulsion. In the case of an oil-in-water emulsion, the oil may be in the form of any suitable nonaqueous liquid, such as mineral oil, diesel oil, fuel oil, kerosene, stove oil, and the like. A plastering-improving clay like bentonite is normally incorporated in the drilling fluid. In addition to clay, a suspended component in the form of a weighting material is often added in order to add weight to the drilling fluid to overcome any formation pressures encountered during drilling operations. Weighting materials commonly used are crushed oyster shells, barites, hematite, magnatite, etc. The weighting material may constitute a substantial portion by weight of the drilling fluid, for example, in the range of 1 to 60%. In the case of drilling emulsions, 0.5 to 5.0% of the suitable emulsifier agent is used, for example, soaps of fatty acid, rosin acids, and the like. In many cases, no emulsifier need be added.

The addition of small quantities of water-soluble hydrocarbon siliconates to a water-base drilling mud causes a substantial reduction in the viscosity of the mud. It has also been found that when any additional clays (for example, clays drilled from the formation and mixed with the mud during drilling operations) become admixed to a water-base drilling fluid containing some of the present siliconates, the viscosity of the drilling fluid is either not increased or is increased to a far lesser extent than in water-base drilling muds free of water-soluble siliconates. Thus, with the present alkaline metal alkyl siliconates incorporated in an aqueous base drilling fluid, it is no longer necessary to resort to chemical treatment or dilution of the drilling fluid to control the viscosity of the drilling fluid. In the most troublesome cases, chemical treatment or dilution of the drilling mud may have to be resorted to in some degree, but always to a lesser degree than with a similar mud not containing water-soluble siliconates.

Wells drilled through heaving shale or other difficult formations with water-base muds containing the present water-soluble silicon compounds offer less difficulties than those drilled with ordinary water-base muds in that the borehole wall is either not adversely affected by the siliconate-treated drilling mud or any adverse effect is greatly minimized, particularly with regard to the caving of the borehole wall. Caving of the borehole wall is eliminated or greatly minimized as the swelling of the clay particles in the drilled formations is prevented to a large extent. Additionally, when using a water-base mud incorporating water-soluble alkyl siliconates, there is no risk of "balling up" of earth or cuttings around the drill bit, drill collars and drill string.

The favorable properties of aqueous drilling fluids to which an alkaline metal alkyl siliconate has been added are further illustrated in the following examples.

In one test, a 5% suspension of bentonite in water was prepared (viscosity 50 g. Stormer). Varying quantities of sodium methyl siliconate were added to this suspension. An additional 5% of dry bentonite was then added to the mud samples with vigorous stirring.

Table 1

| Concentration of Siliconate | Stirring Time, minutes | Viscosity (Stormer), g. |
| --- | --- | --- |
| 0 | 1 | (1) |
| 1% | 10 | 200 |
| 2% | 10 | 170 |
| 5% | 10 | 70 |

1 Too high for measurement.

From the results shown in Table I, it may be seen that an increase in viscosity of the mud samples resulting from the addition of the second 5% of dry bentonite is counteracted and the viscosity maintained at a reduced value in the samples incorporating the hydrocarbon siliconate. In other words, the hydration of the bentonite in three of the four samples is considerably retarded by the presence of the siliconate. This test shows that additional clay which commonly becomes incorporated in the drilling fluid, from the formations being drilled through, does not increase the viscosity of the drilling fluid, or, in any case, minimizes any increase in viscosity which would otherwise have occurred.

In a second series of tests, a normal clay-water drilling fluid was prepared containing 5% of a clay known as La Paz clay. Varying quantities of sodium methyl siliconate were dissolved in samples of this drilling fluid. 30 grams of La Paz clay were added in powder form to 250 mls. of each of the samples of drilling fluids thus prepared, after which the samples were vigorously stirred for 10 minutes.

Table II

| | Viscosity (Stormer) | | Gel Strength After 0 min./10 min. | | | |
| --- | --- | --- | --- | --- | --- | --- |
| | Original Clay Content | With Extra Clay Added | Original Clay Content | | With Extra Clay Added | |
| Original drilling fluid | 95 | 185 | 20 | 35 | 60 | 90 |
| idem + 1% siliconate | 75 | 145 | 2 | 10 | 8 | 35 |
| idem + 2% siliconate | 76 | 135 | 3 | 18 | 5 | 30 |
| idem + 4% siliconate | 76 | 105 | 5 | 25 | 5 | 28 |

The gel strength was measured with a Stormer viscosimeter after zero minutes and 10 minutes. These results, shown in Table II, demonstrate the favorable effect of the presence of water-soluble hydrocarbon siliconates in water-base muds for reducing the viscosities of the samples and for maintaining the gel strength at a low value.

In a third test, fragments of La Paz clay were put into water, and into a 3% solution of sodium methyl siliconate. The clay placed in the water disintegrated rapidly until only a soft powder remained. The other fragments of clay in the sodium methyl siliconate solution exhibited only slight disintegration during the first minutes. After 24 hours, the clay fragments in the second solution had retained their original shape and were quite firm. This test showed that the addition of water-soluble hydrocarbon siliconates to a water-base drilling mud in accordance with the present invention yielded a drilling mud possessing the property of counteracting normal swelling and disintegration of clays when immersed in water.

Similar reductions in viscosity of water-base drilling fluids were exhibited in tests wherein the present hydrocarbon siliconates were incorporated in an emulsion mud containing 20% crude oil emulsified therein, said emulsion being stabilized with 0.5% carboxymethylcellulose. The zero and 10 minute gel strengths for these samples of emulsion mud also showed substantial reduction. However, in order to obtain the greatest benefits by the addition of water-soluble hydrocarbon siliconates to water-base muds in accordance with the present invention, it is important to keep the pH value of the drilling mud relatively low, the best results being obtained when the mud has a pH value below 12 and preferably below 10.

When an 81 pound per cubic foot La Paz shale mud containing 3 pounds per barrel each of quebracho and caustic soda was treated with 1, 2 and 4% solutions of a water-soluble siliconate, no substantial changes were noted in the viscosity or gel strength of the muds when 1 and 2% of the siliconate have been added. On the other hand, a definite detrimental effect was noted when 4% of siliconate had ben added. Likewise, only slight beneficial effects were noted in the viscosity of a La Paz shale red mud weighing 88 pounds per cubic foot with 1 and 2% of siliconate present, but definitely detrimental effects were exhibited when as much as 4% siliconate was present. Both of the red muds made with La Paz clay had a pH of 13. High pH red mud emulsions incorporating 20% of crude oil also showed increases in the viscosity in the gel strength when 1, 2 or 4% of the present siliconates was added thereto. These tests show that the pH of the drilling mud or emulsion being treated must be no greater than 12 and preferably below 10.

I claim as my invention:

1. A water-base drilling mud comprising an aqueous fluid mixture having a pH no greater than 12 containing suspended inorganic solids which form a filter cake on the wall of a well, and from 0.1% to 5% by weight of an alkaline metal hydrocarbon siliconate.

2. A water-base drilling mud comprising an aqueous fluid mixture having a pH no greater than 12 containing suspended inorganic solids which form a filter cake on the wall of a well, and from 0.1% to 5% by weight of an alkaline metal alkyl siliconate.

3. A water-base drilling mud comprising an aqueous fluid mixture having a pH no greater than 12 containing suspended inorganic solids which form a filter cake on the wall of a well, and from 0.1% to 5% by weight of an alkali metal alkyl siliconate.

4. An oil-in-water drilling emulsion mud including an alkaline metal alkyl siliconate in an amount between 0.1% and 2% by weight of the total weight of the mud, said mud having a pH of no greater than 12.

5. An oil-in-water drilling emulsion mud including an alkali metal alkyl siliconate in an amount between 0.1% and 2% by weight of the total weight of the mud, the pH of said mud being no greater than 12.

6. An oil-in-water drilling emulsion mud including an alkaline earth metal alkyl siliconate in an amount between 0.1% and 2% by weight of the total weight of the mud, the pH of said mud being no greater than 12.

7. A water-base drilling mud for well drilling operations, said mud comprising sufficient water to maintain the mud as a fluid, sufficient clayey material to form a filter cake on the wall of the well and an alkaline metal hydrocarbon siliconate in an amount sufficient to maintain the viscosity of the drilling fluid at a value sufficiently low for circulating purposes, said mud having a pH of no greater than 12.

8. A water-base drilling mud for well drilling operations, said mud comprising sufficient water to maintain the mud as a fluid, sufficient clayey material to form a filter cake on the wall of the well and an alkali metal alkyl siliconate in an amount sufficient to maintain the viscosity of the drilling fluid at a value sufficiently low for circulating purposes, said mud having a pH of no greater than 12.

9. A water-base drilling mud for well drilling operations, said mud comprising sufficient water to maintain the mud as a fluid, sufficient clayey material to form a filter cake on the wall of the well and an alkaline earth metal alkyl siliconate in an amount sufficient to maintain the viscosity of the drilling fluid at a value sufficiently low for circulating purposes, said mud having a pH of no greater than 12.

10. In a process for drilling a well with well drilling tools wherein there is circulated in the well a water-base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith an alkaline metal hydrocarbon siliconate in an amount sufficient to maintain the viscosity of said mud at such value that it may be readily circulated, contacting said wall of said well with the resulting drilling mud to form said filter cake thereon, and maintaining the pH of said mud at a value no greater than 12.

11. In a process for drilling a well with well drilling tools wherein there is circulated in the well a water-base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith an alkaline metal alkyl siliconate in an amount sufficient to maintain the viscosity of said mud at such value that it may be readily circulated, contacting said wall of said well with the resulting drilling mud to form said filter cake thereon, and maintaining the pH of said mud at a value no greater than 12.

References Cited in the file of this patent

UNITED STATES PATENTS

| | | |
|---|---|---|
| 2,438,055 | Hyde et al. | Mar. 16, 1948 |
| 2,472,799 | Hyde | June 14, 1949 |
| 2,587,636 | MacMullen | Mar. 4, 1952 |